Oct. 30, 1962   D. J. P. DETHIER   3,060,447
STIFFENING DEVICE FOR COLLARS AND DETACHABLE COLLARS, AND
COLLARS AND DETACHABLE COLLARS CONDITIONED FOR
APPLYING SUCH STIFFENING DEVICE
Filed March 17, 1958   2 Sheets-Sheet 1
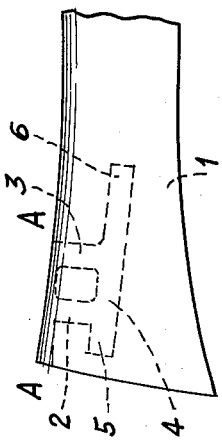
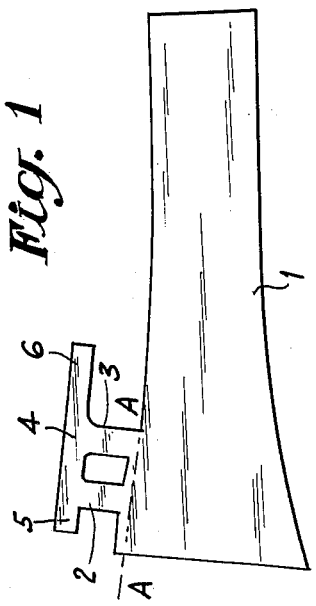
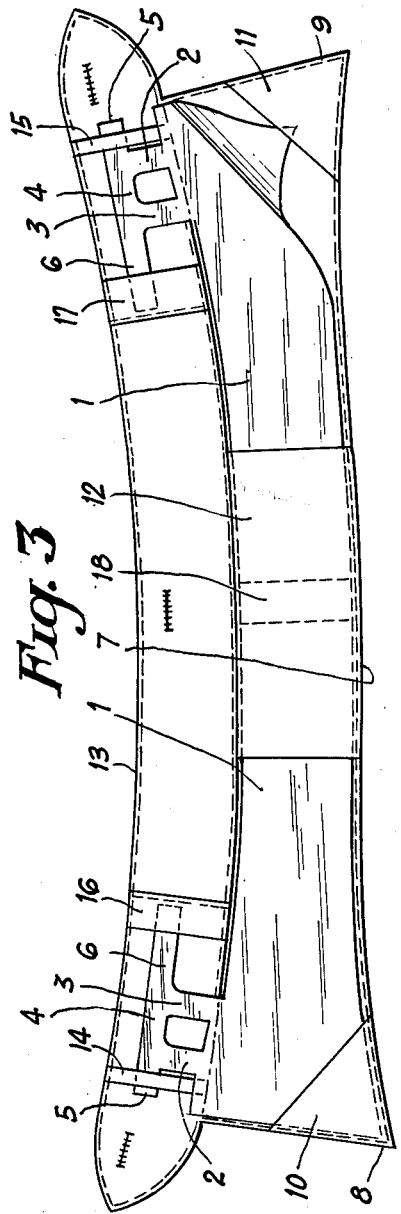
INVENTOR.
Désiré Joanna Pieter Dethier
BY Nathan J. Kraus
Frank H. Morlos
Attorneys Oct. 30, 1962 D. J. P. DETHIER 3,060,447
STIFFENING DEVICE FOR COLLARS AND DETACHABLE COLLARS, AND
COLLARS AND DETACHABLE COLLARS CONDITIONED FOR
APPLYING SUCH STIFFENING DEVICE
Filed March 17, 1958 2 Sheets-Sheet 2
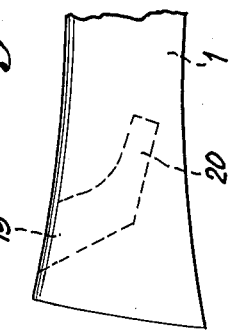
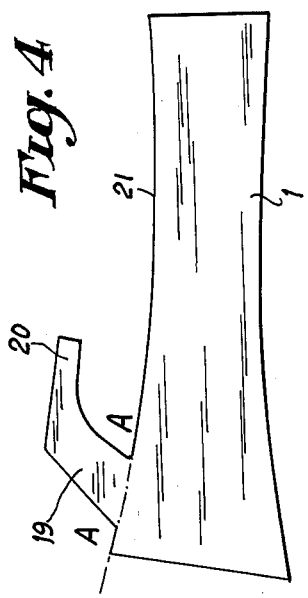
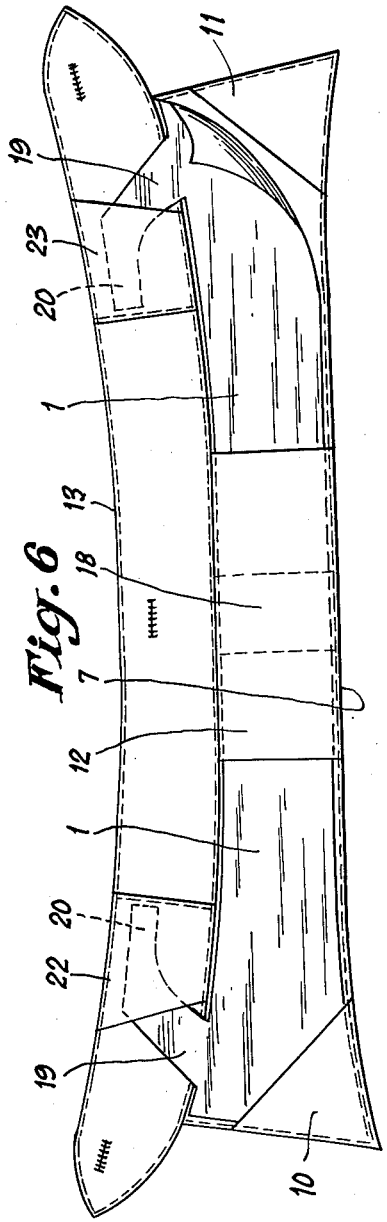
INVENTOR.
Dēsirē Joanna Pieter Dethier
BY
Attorneys

3,060,447

STIFFENING DEVICE FOR COLLARS AND DETACHABLE COLLARS, AND COLLARS AND DETACHABLE COLLARS CONDITIONED FOR APPLYING SUCH STIFFENING DEVICE

Désiré Joanna Pieter Dethier, Korte Heistraat 31, Malines, Belgium
Filed Mar. 17, 1958, Ser. No. 721,880
Claims priority, application Belgium Mar. 29, 1957
2 Claims. (Cl. 2—132)

Many stiffening devices for collars and detachable collars are known. They mostly consist of comparatively narrow elements made of some material which is sufficiently stiff and also comparatively pliable, which are partially housed into pockets, specially provided for this purpose in the collar or detachable collar.

On account of their conformation, their comparatively small dimensions and their position in the collar or detachable collar, these stiffening elements of any kind whatever are only partially effective and it is a well known fact that soft collars and detachable soft collars are practically always creased or rimpled, which is mostly due either to the tension to which the collar is subjected, or to the effect of movements, or in a still more general way, under the action of perspiration.

The present invention concerns a stiffening device of new design the object of which is to impart systematically to the soft collar or the soft detachable collar an appearance which is practically identical to that of a stiff collar or stiff detachable collar, but without entailing the numerous disadvantages of the latter.

With this aim in view, the stiffening device forming the subject of the present invention consists substantially of two elements made of such a material which is sufficiently stiff but comparatively pliable, whereby each element is shaped so as to make it possible to juxtapose same to the collar or detachable collar, so that each element extends at least over one half of the length and, preferably even, so far that the elements overlap slightly toward the middle of aforesaid collar or detachable collar; each of these elements is fitted moreover with at least one fastening element, and aforesaid elements, with their fastening elements, are attached to the collar or detachable collar by means of fixed loops or pockets or adequate gussets.

The results obtained by applying these characteristic features is, contrary to what happens when applying any of the known devices, that the collar or detachable collar is uniformly stiffened in all its parts, thus having the same faultless appearance of a dressed collar, but without inheriting of the vulnerability of the latter. Thus, whatever the temperature or the state of perspiration may be, the soft collar or detachable soft collar which has thus been stiffened will always retain its faultless appearance, which is certainly not the case with dressed collars the dressing of which is mostly made of a soluble material, which fact soon results in a softening of the collar, with all the inconveniences which this entails.

The stiffening device which is the subject of the present invention also offers all the advantages of collars or detachable collars which have been stiffened by means of thermo-hardening plastic substances, without having the technical and economical disadvantages which are inherent to the very particular application of aforesaid plastic materials.

The constitutive elements of the stiffening device according to the invention can thus assume infinitely variable shapes, considering that they may be either strictly or approximately adapted to the shape and the dimensions of the collars or detachable collars to be fitted therewith. These elements are also capable of comprising an indetermined number of variants, on account of the essentially variable shapes, dimensions, numbers and relative positions of the fixing or fastening elements.

The invention covers all these embodiments as well as the collars or detachable collars specially conditioned for being fitted with such stiffening elements.

It is thus merely by way of example and without implying any limitation that two embodiments are described in detail hereafter, with reference to the appended drawings in which:

FIGURE 1 represents the development of a stiffening device according to the invention;

FIGURE 2 is a partial representation of the same stiffening element in its normal position;

FIGURE 3 represents an opened-out collar or detachable collar fitted with the stiffening elements as represented in FIGURES 1 and 2, whereby the stiffening element illustrated at the left is shown in its final position whereas the right-hand element is shown in a characteristic position of fastening to the collar or detachable collar.

As shown in FIGURE 1, one element of the stiffening device according to the invention consists of a thin plate or strip 1 made of a material which is at the same time stiff and supple, generally some plastic material, whose shape is similar to that of at least one half of the external or visible part of the collar or detachable collar; preferably even, the length of this plate or strip 1 is slightly larger than the halflength of the collar or detachable collar. This element comprises a fixing tab consisting, in the present instance, of two small uprights 2—3 and a cross-piece 4 both ends 5—6 of which project outside beyond aforesaid uprights. This tab can be bent over the plate or strip 1 along the folding line A—A, as shown in FIGURE 2. In order to be ready to receive such stiffening elements, the collar or detachable collar, such as it is represented in opened-out position in FIGURE 3, is fitted with appropriate lops or pockets for the strip or plate as well as for the fastening tab 2—6.

For accommodating aforesaid plate or strip 1, the external visible part 7 of the collar or detachable collar is fitted, near its corners 8—9, with triangularly shaped pockets, 10—11 respectively, and in its central part, with a fixed comparatively wide loop 12. For fastening the tabs 2—6, the inner band 13 of the collar or detachable collar is fitted with two fixed loops 14—15 for the salient part 5 of the fastening device and with two pockets 16—17 for the salient parts 6 of aforesaid fastening elements.

Hence, as shown in FIGURE 3, both stiffening elements are connected to the collar or detachable collar in such way that they lay, so to say, side by side over the entire surface of the visible part 7 of the collar or detachable collar, while overlapping slightly in the central part 18 of same. The result is, that the latter is being stiffened in all its parts.

In the example illustrated in FIGURES 4, 5 and 6, the same characteristics are present, so to say, except the fastening tabs which, in this instance, assume the shape of a bent finger 19.

As shown in FIGURE 4, each stiffening element is thus made-up of a plate or strip 1, as has been described before, and of such a fastening finger 19 located at a short distance of the left-hand top corner of aforesaid strip or plate, and this finger is disposed in such way that its overhanging part 20 points toward the middle of the collar or detachable collar. The folding line A—A coincides with the upper edge 21 of aforesaid plate or strip 1.

As schematized in FIGURE 6, the collar or detachable collar is fitted with the same corner pockets 10—11 and the fixed central loop 12; the base part 13 of the collar or detachable collar is fitted with two pockets 22—23 into which the fastening fingers 19—20 of the stiffening elements can be engaged.

FIGURE 6 fully illustrates the way in which aforesaid stiffening elements are fastened to the collar or detachable collar.

As was explained above, the fastening loops or pockets for aforesaid fastening elements as well as these fastening elements themselves, can be designed in a wide variety of ways.

The plates or strips 1 may either be full or slotted, but must in any case be designed so as to lie side by side over the whole length or approximately over the whole length of the internal surface of the visible part of the collar or detachable collar.

Any convenient material may be used, such as cardboard, compressed pasteboard, plastic, Celluloid and others.

What I claim is:

1. In combination with a soft collar having an attached neckband, a stiffening device for said collar comprising:
   (a) a pair of similar flexible members each having a body portion shaped to be coextensive in area and form to at least one-half of the collar,
   (b) each of said members having a tab portion integral with the upper edge of its body portion and in close proximity to the outer extremity thereof,
   (c) each of said tab portions having a relatively narrow section spaced from the upper edge of a respective body portion and extending longitudinally thereof,
   (d) said collar on its inner surface having at the extremities and intermediately thereof pockets arranged to receive respectively the inner and outer ends of said body portions,
   (e) the pockets at the extremities each being open in a direction towards the center of the collar,
   (f) said neck band having pockets arranged to receive said tab portions and being open in a direction towards the extremities of the neck band whereby said members are secured in contiguous relation to the inner surface of said collar.

2. The invention as defined in claim 1 in which the inner end portions of the body portions overlap each other within the intermediate pocket.

References Cited in the file of this patent

UNITED STATES PATENTS

| | | |
|---|---|---|
| 643,793 | Gould | Feb. 20, 1900 |
| 653,800 | Gould | July 17, 1900 |
| 1,605,585 | Hoffenberg | Nov. 2, 1926 |
| 1,916,794 | Haven | July 4, 1933 |
| 2,031,776 | Honigsberg | Feb. 25, 1936 |
| 2,587,491 | Less | Feb. 26, 1952 |

FOREIGN PATENTS

| | | |
|---|---|---|
| 157,513 | Austria | Dec. 11, 1939 |